United States Patent [19]

Tesch

[11] 4,292,367
[45] Sep. 29, 1981

[54] PATTERNED TEXTILE MATERIAL

[75] Inventor: Günter Tesch, Fribourg, Switzerland

[73] Assignee: Breveteam S.A., Fribourg, Switzerland

[21] Appl. No.: 109,303

[22] Filed: Jan. 3, 1980

[30] Foreign Application Priority Data

Jan. 9, 1979 [CH] Switzerland ............ 158/79

[51] Int. Cl.³ ............................................. B32B 5/06
[52] U.S. Cl. ..................... 428/300; 28/107; 28/109; 428/109; 428/234; 428/243; 428/294
[58] Field of Search .................. 428/255; 28/107, 109; 428/300, 234, 297, 303, 85, 91, 293, 294, 255, 109; 156/148

[56] References Cited

U.S. PATENT DOCUMENTS 3,077,657  2/1963  Wells ....................... 28/109
3,243,861  4/1966  Kumin et al. ............ 28/109
3,649,400  3/1972  Sawaki et al. ........... 156/148

Primary Examiner—James J. Bell
Attorney, Agent, or Firm—Ernest F. Marmorek

[57] ABSTRACT

An outer thread layer, which forms a predetermined pattern from a plurality of endless threads, is connected to a carrier by attaching portions of at least some of the threads to the carrier.

18 Claims, 5 Drawing Figures

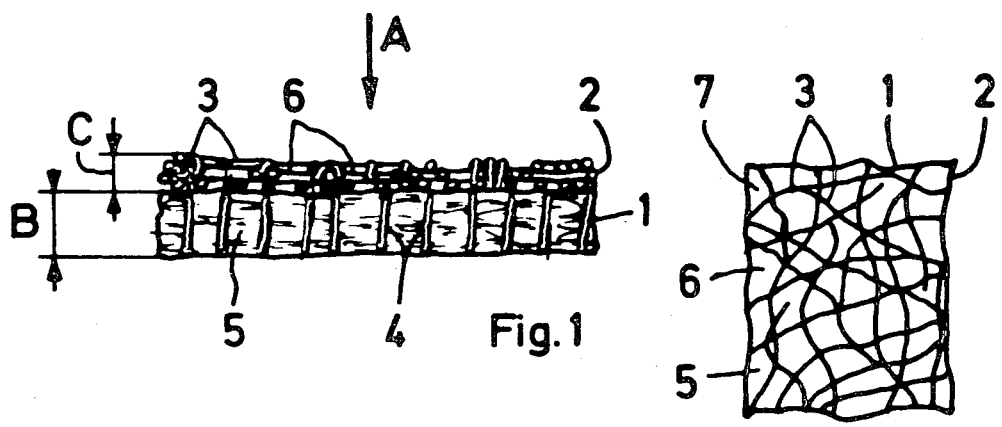
Fig. 1
Fig. 2
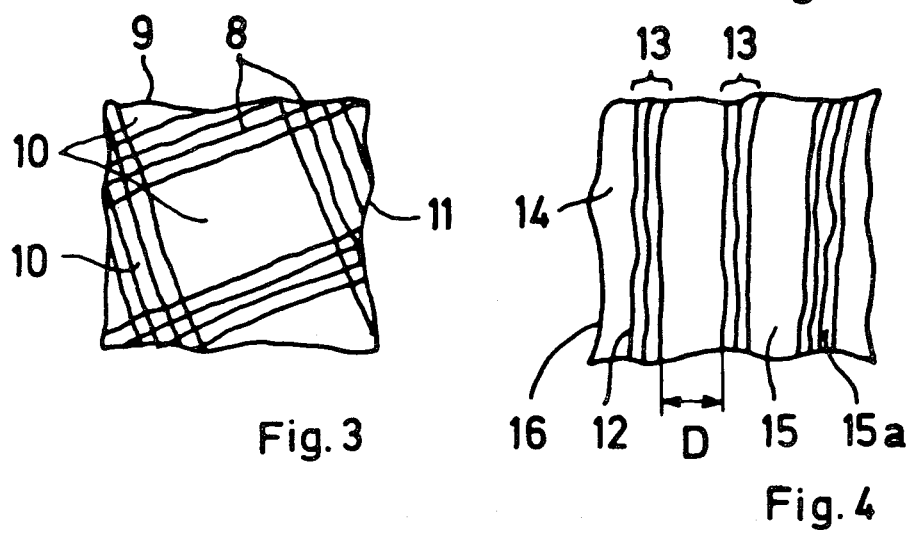
Fig. 3
Fig. 4
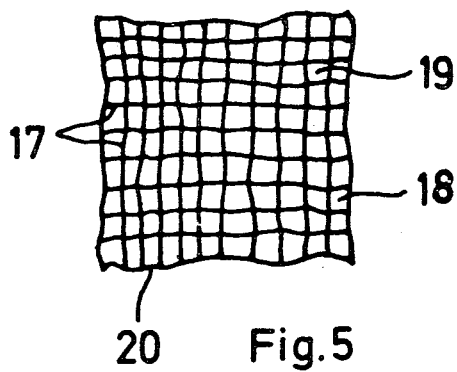
Fig. 5

PATTERNED TEXTILE MATERIAL

BACKGROUND OF THE INVENTION

The invention relates to textiles in which a plurality of threads form a layer which is attached to a carrier.

In textiles of this type made heretofore, as disclosed for example in Swiss Pat. No. 401,893, dated Nov. 15, 1965, it is necessary to make first a design or pattern of a textile layer from threads, and only thereafter to attach the completed layer to a carrier by needling. This is expensive, and offers the further drawback of difficulty in changing the pattern quickly. The techniques of needling, needle-working or needle-punching are described, for example, in Krvma, Manual of Nonwovens, Textile Trade Press, Manchester, England (1971).

A floor covering is also known, which is composed of a textile layer, in which threads spun from individual fibers form a pattern; this textile layer is deposited on a carrier made of fibrous material. The textile layer, composed of threads, is then covered with another fibrous layer, which is active with respect to needle-punching, and the fibrous layer is thereafter needled onto the carrier. The threads are maintained in their position by virtue of being needled onto the carrier. The pattern is visible on these textile materials through the upper fibrous covering layer. But, as a result of the use of the covering layer, it is not possible to manufacture such materials, using an adequately large number of differing patterns or designs; furthermore, the additional use of the covering layer renders the manufacture of such materials expensive.

It is therefore an object of the present invention to devise a patterned textile material in which a patterned surface is obtained without any need of expensive preparatory work for creating the material, or of any additional measures to attach the threads to a carrier.

SUMMARY OF THE INVENTION

This object is attained by disposing an outer layer, composed of a plurality of threads, which forms a pattern, on a carrier, and attaching the thread layer to the carrier, by active needling of the threads.

Further objects and advantages of the invention will be set forth in part in the following Specification, and in part will be obvious therefrom without being specifically referred to, the same being realized and attained as pointed out in the claims hereof.

BRIEF DESCRIPTION OF THE DRAWINGS

For a fuller understanding of the nature and objects of the invention, reference should be had to the following detailed description, taken in connection with the accompanying drawing in which:

FIG. 1 is a fragmentary sectional view of a patterned textile material;

FIG. 2 is a fragmentary plan view of the patterned textile material, when viewed in the direction of the arrow A in FIG. 1;

FIG. 3 is a fragmentary plan view of a modified patterned textile material;

FIG. 4 is a fragmentary plan view of another modified patterned textile material; and FIG. 5 is a fragmentary plan view of still another modified textile material.

DESCRIPTION OF THE PREFERRED EMBODIMENTS

In carrying the invention into effect, and referring now particularly to FIGS. 1 and 2, there is shown a textile sheet material 1, including a thread layer 2, which is composed of individual endless threads or filaments 3. The threads 3 are capable of being actively needled by needle-punching or needle-working onto a carrier 5 by means of a needle, or the like. In the embodiment shown, the layer 2 is mounted onto the carrier 5 by withdrawing or projecting a number of fiber pieces 4, e.g. fiber end pieces, from the individual threads 3, and needling the fiber pieces as holding fibers to the carrier 5. The carrier 5 has preferably a background contrasting with that of the threads 3. The carrier 5 has a thickness B, which exceeds the depth C of the thread layer 2. The endless threads 3 are disposed on, and attached to the carrier 5, for example, in an irregular manner, and are spaced from one another by distances 6, so that the carrier 5 is only partially, i.e. not completely covered by the threads 3; a surface 7 of the carrier 5 is thus partially visible through an area defined by the respective distances 6, separating the threads 3. The material 1 is therefore formed on its surface with a design corresponding to the pattern of the endless threads 3 on the carrier 5.

As can be seen, particularly in FIG. 3, endless threads 8, for example, cross other endless threads 8, so as to form a substantially square pattern visible on a carrier 9; there remain spaces 10, through which the carrier 9 is visible, so that a distinct pattern 11 is formed. The endless threads 8 are attached to the carrier 9 by being needled, thereonto, similarly to the method of making the textile material shown in FIGS. 1 and 2.

In the modified textile pattern shown in FIG. 4, endless threads 12 are grouped into groups 13, which in turn are attached to a carrier 14 by being needled thereonto. The groups of threads 13 are spaced from one another by respective distances D across spacings 15, so that the carrier 14 is visible through the areas defined by the spacings 15, as well as through the relatively smaller areas, defined by the spacings 15a existing between the individual threads 12 within a group. A resulting design of a pattern 16 is formed.

In the modified textile pattern shown in FIG. 5, individual endless threads 17 are disposed on a carrier 18 in the form of a mesh; the endless threads 17 are needled onto the carrier 18 in a manner similar to that discussed with respect to FIGS. 1 and 2. The carrier 17 is visible through the mesh openings 19, so that a corresponding patterned textile material 20 is formed. This arrangement also conveniently permits a better strengthening of the individual threads 17 as desired.

In summary, it will therefore be understood, that the endless threads, which have been hitherto used in the field of manufacturing tufted materials or fabrics, are surprisingly also suitable for being grouped or arranged into desired patterns in the field of needle-felting, according to a desired structure or coloring. As the threads form a layer of a prearranged depth, and are spaced from one another by prearranged distances, a distinct relief or embossment pattern is obtained, which may give rise to a multiplicity of designs or patterns. The textile materials, according to the invention, are also less costly to manufacture, than the textile materials of the prior art; for example, any expensive preparatory work for the fabrication of a desired textile pattern, or the use of a twisted thread, which is costly to manufacture, can be dispensed with. Depending on the type, quality and/or specific requirements, different patterns can be obtained with one and the same type of endless thread. The specific arrangement of the individual endless threads on a contrasting carrier, which cover the carrier only partially, renders the carrier partly visible through spacings separating, for example, the individual threads 3, or groups of threads 13.

This can be obtained in several ways, for example, by multiple filaments, by a crossed arrangement of the endless threads 12, as shown, for example, in FIG. 3, or by disposing the endless threads 8, 13 or 17 parallel to one another, as shown, for example, in FIGS. 3, 4 and 5, and by bunching the threads 8 and 12 in groups, as shown for example, in FIGS. 3 and 4. These groups are then spaced from one another by respective predetermined spacings, such as, for example, the spacings 15, shown in FIG. 4. In one modified form of the invention, the endless threads 3, 8, 12, or 17 may be dyed, and the carrier 5 may be colored or dyed differently than the threads; thus, it is possible to obtain definite color patterns, or mixtures of colors, for the textile materials. The endless threads themselves may be dyed initially also. Thus, it is possible, for example, to obtain textile materials, which appear so genuine in color, that they compare favorably with a pattern obtained by textile printing.

In another modification of the invention, the carrier 5 may be a fibrous layer, for example, a non-woven fabric, a fabric, a knitted material, or the like. The carrier 5 may, for example, have a thickness exceeding the depth of the thread layer 2, so that the textile material, according to the invention, may be advantageously used as a floor covering. The endless threads 3 may, for example, also be slightly twisted, which has the advantage that they are held together more closely, when they are deposited on the carrier 5, and that they can also be active for needling onto the carrier 5 more easily. Depending on the type of needling of the thread layer 2 to the carrier 5, it is possible to avoid the impression, that the textile material is formed by the endless threads 3 being simply deposited on the carrier 5. As a result of the endless threads 3 being disposed on the surface of the carrier 5, the textile materials, according to the invention, are, for example, highly wear-resistant.

The textile materials can also be used as a cloth, floor covering, wall covering, upholstery, or for any other decorative purposes. The endless threads 3, depending on their application, may be composed of any suitable material for example, polypropylene, polyester, or polyamid, and the like. The individual thread 3 may have a fineness or linear density from about, for example, 1000 dtex to, for example, 4000 dtex. It is also possible to provide a combination of endless threads 3 of different respective fineness and/or different types of endless threads, if this is advantageous or desirable for the textile patter to be manufactured. The finer, for example, the endless threads 3, the smaller is the weight of the endless threads 3 required to provide the desired pattern of not completely covering the carrier 5. The endless threads may have, for example, a weight of 200 grams per square meter, so as to obtain the desired pattern.

The endless threads 3 may also be textured; for example, they may be crimped or crinkled, which results in the threads 3 covering the carrier 5 more completely, and additionally permits a firm attachment of the thread layer 2 to the carrier 5. The threads 3 may be dyed similarly, or differently, from one another, and if desired, the textile material may additionally be dyed following attachment of the threads 3 to the carrier 5. The textile threads 3 may be impregnated or coated in a known manner, so that a compound layer results, which has a high degree of rigidity or strength suitable for a variety of technical purposes.

In a process of uniting a layer 2, composed of endless threads 3 with a carrier 2, so as to complete a textile material 1, and wherein each thread 3 includes individual fiber pieces 4, the steps include placing the layer 2 on the carrier 5, projecting at least some of the fiber pieces from respective threads 3, by means of a needle, and attaching the fiber pieces to the carrier 5.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A textile material, comprising in combination:
   a carrier,
   an outer layer composed of individual endless threads, mounted on, and covering a portion of said carrier, and forming a predetermined design thereon, leaving visible the remainder of said carrier, said threads being separated from one another by respective prearranged distances, and
   holding fibers, including fiber pieces emanating and projecting from at least some of said threads, said fiber pieces attaching said layer to said carrier by active needling.

2. A textile material as claimed in claim 1, wherein some of said individual endless threads cross others.

3. A textile material as claimed in claim 1, wherein said endless threads include a plurality of groups disposed substantially parallel to one another and being spaced from one another by respective predetermined distances.

4. A textile material as claimed in claim 1, wherein said layer of individual endless threads is composed of multifilaments.

5. A textile material as claimed in claim 1, wherein said endless threads are slightly twisted.

6. A textile material as claimed in claim 1, wherein said endless threads have a prearranged depth, and said carrier has a predetermined thickness exceeding said depth.

7. A textile material as claimed in claim 6, wherein said endless threads are distributed on said carrier in a predetermined manner, so as to obtain a prearranged embossment pattern.

8. A textile material as claimed in claim 1, wherein said endless threads are composed of a synthetic material.

9. A textile material as claimed in claim 1, wherein said said endless threads disposed on said carrier have a weight of about 200 grams per square meter.

10. A textile material as claimed in claim 1, wherein said endless threads have a fineness from about 1000 dtex to about 4000 dtex.

11. A textile material as claimed in claim 1, wherein said endless threads are colored, and wherein some of said threads are colored differently than the remaining threads.

12. A textile material as claimed in claim 1, wherein said carrier comprises fibrous material.

13. A textile material as claimed in claim 1, wherein said endless threads are colored, and said carrier is colored differently than said threads.

14. In a process of uniting a layer composed of individual endless threads with a carrier, thereby completing a textile material, each thread including individual fiber pieces, the steps comprising:

depositing the individual endless threads of said layer on said carrier in spaced apart relationship from one another at respective prearranged distances, so as to leave said carrier partially visible through an area defined by said respective prearranged distances, projecting at least some of said fiber pieces from respective threads, and needle-punching said fiber pieces to said carrier.

15. A cloth manufactured in accordance with the process of claim 14.

16. A floor covering manufactured in accordance with the process of claim 14.

17. A decorative material manufactured in accordance with the process of claim 14.

18. An upholstery material manufactured in accordance with the process of claim 14.

* * * * *